(12) United States Patent
Passalacqua et al.

(10) Patent No.: US 9,022,184 B2
(45) Date of Patent: May 5, 2015

(54) BRAKE PAD FOR VEHICLE DISC BRAKE

(75) Inventors: Monica Passalacqua, San Mauro Torinese (IT); Roberto Passalacqua, San Mauro Torinese (IT); Corrado Olivero, Turin (IT); Carla Mazzucchetti, San Mauro Torinese (IT)

(73) Assignee: Consulplast S.r.l., Settimo Torinese, Turin (IT)

( * ) Notice: Subject to any disclaimer, the term of this patent is extended or adjusted under 35 U.S.C. 154(b) by 0 days.

(21) Appl. No.: 13/393,766

(22) PCT Filed: Jun. 18, 2010

(86) PCT No.: PCT/IB2010/052768
§ 371 (c)(1),
(2), (4) Date: Mar. 1, 2012

(87) PCT Pub. No.: WO2011/033395
PCT Pub. Date: Mar. 24, 2011

(65) Prior Publication Data
US 2012/0160616 A1    Jun. 28, 2012

(30) Foreign Application Priority Data
Sep. 17, 2009  (IT) .............................. TO2009A0709

(51) Int. Cl.
*F16D 69/00* (2006.01)
*F16D 69/04* (2006.01)

(52) U.S. Cl.
CPC .................................. *F16D 69/0408* (2013.01)

(58) Field of Classification Search
CPC . F16D 69/04; F16D 69/0408; F16D 69/0416; F16D 65/092

USPC ............. 188/251 R, 252, 253, 254, 257, 258, 188/251 A, 250 B, 255, 256
See application file for complete search history.

(56) References Cited

U.S. PATENT DOCUMENTS 1,880,750 A * 10/1932 Brackett .................... 188/251 R
2,869,689 A *  1/1959 Wilson ....................... 188/251 R
(Continued)

FOREIGN PATENT DOCUMENTS

DE      31 24 527 A1    1/1983
DE      90 02 145 U1    4/1990
(Continued)

OTHER PUBLICATIONS

Machine Translation of WO 2010/015897.*
(Continued)

*Primary Examiner* — Nicholas J Lane
(74) *Attorney, Agent, or Firm* — Merchant & Gould P.C.

(57) ABSTRACT

A brake pad (10) includes a backing plate (12) of plastic material, a friction lining (14) overmolded on the backing plate (12) and a metal reinforcement plate (16) embedded in the backing plate (12). The backing plate (12) has a solid peripheral structure (18) and an inner structure (20) made as a grid-like reticular structure having a plurality of cavities (22) evenly distributed on its surface and filled at least partially by the material of the friction lining (14). At least part of the cavities (22) are made as through cavities, whereby the friction lining (14) forms columns (24) which extend into the through cavities (22) and improve the adhesion between the friction lining (14) and the backing plate (12). The area of the through cavities (22) amounts at least to 4.5% of the area of the face of the friction lining (14) opposite to the one in contact with the backing plate (12).

9 Claims, 3 Drawing Sheets

(56) References Cited

U.S. PATENT DOCUMENTS

| | | | | |
|---|---|---|---|---|
| 4,552,252 | A | * | 11/1985 | Stahl .............................. 188/73.1 |
| 4,991,697 | A | * | 2/1991 | Hummel et al. .......... 188/250 B |
| 6,267,206 | B1 | * | 7/2001 | Grimme et al. ............. 188/73.1 |
| 6,390,251 | B1 | * | 5/2002 | Hasegawa ................ 188/251 M |
| 6,474,453 | B2 | * | 11/2002 | Sano ......................... 188/251 A |
| 2004/0224590 | A1 | * | 11/2004 | Rawa et al. ................... 442/176 |
| 2005/0161297 | A1 | * | 7/2005 | Uwaydah .................. 188/250 B |
| 2009/0026028 | A1 | * | 1/2009 | Gasslbauer ................... 188/256 |
| 2011/0198170 | A1 | * | 8/2011 | Turani et al. .............. 188/250 B |
| 2011/0220441 | A1 | * | 9/2011 | Zhang ....................... 188/250 B |

FOREIGN PATENT DOCUMENTS

| | | | | |
|---|---|---|---|---|
| EP | 0 918 172 | A1 | | 5/1999 |
| FR | 2508129 | | * | 6/1982 ............. F16D 69/04 |
| GB | 1 185 179 | A | | 3/1970 |
| IT | 1151653 | B | | 12/1986 |
| WO | WO 2010/015897 | | * | 2/2010 ............. F16D 69/02 |

OTHER PUBLICATIONS

International Search Report for corresponding International Patent Application Serial No. PCT/IB2010/052768 mailed Sep. 7, 2010.

* cited by examiner

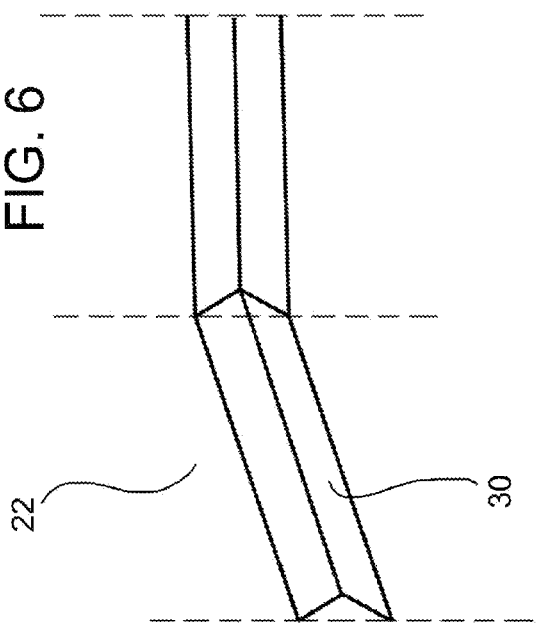
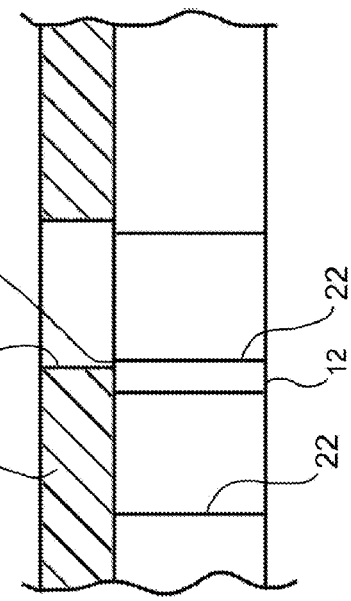
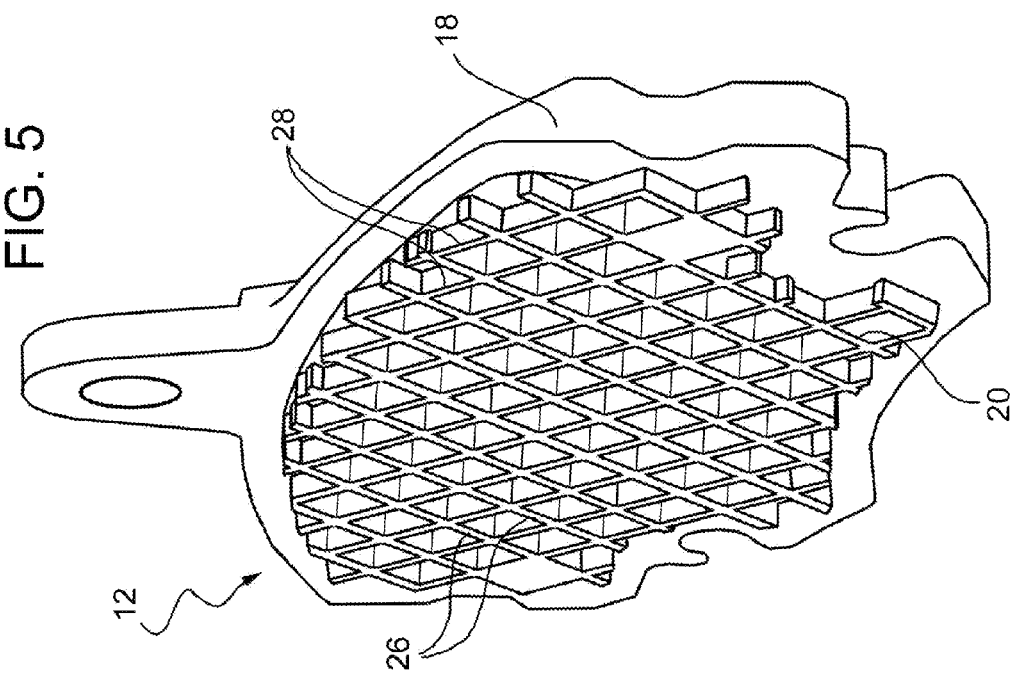

BRAKE PAD FOR VEHICLE DISC BRAKE

The present invention relates to a brake pad, particularly for vehicle disc brakes. Although the invention has been conceived, and is hereinafter disclosed, with reference to its application to a vehicle disc brake, it is naturally applicable to brakes of different kind, provided that they use brake pads comprising a backing plate and a friction lining fixed to the backing plate.

At present, the brake pads for vehicle disc brakes generally used are basically composed of the following components:

- a friction lining typically obtained by moulding and hardening by means of hot or cold process from materials in powder or granular form;
- a backing plate of metal, typically of standardized steel (S235JR or S420MC steel), which is formed by means of blanking and subsequently subjected to washing and then to sandblasting, shot-peening or similar process in order to roughen the surface of the face of the plate to which the friction lining is bonded;
- a layer of thermosetting organic adhesive typically applied by means of rollers or spraying, the adhesive curing or hardening simultaneously with the moulding of the friction lining or after that process;
- a thin sheet of composite material typically consisting of a rubber and steel sandwich, with an intermediate layer of steel interposed between a pair outer layers of rubber, to prevent the brake pad from whistling and to act as insulator against the heat generated during braking due to the friction between the friction lining of the brake pad and the brake disc against which the brake pad is pressed;
- a layer of anti-corrosion protective acrylic-, epoxy- or polyurethane-based paint which is applied by means of an electrostatic system and/or by means of a fluidised-bed system; and
- a wear indicator device for indicating the maximum wear level of the friction lining allowed in order to guarantee safe operation of the brake pad.

One of the drawbacks of the brake pads having a backing plate of metal is the high number of method steps required to manufacture and finish the backing plate, as well as to prepare the backing plate for the subsequent moulding of the friction material. Moreover, many of these steps must be carried out by hand and therefore they significantly affect both the overall duration of the production cycle and the cost of the end product. Furthermore, the use of a backing plate of metal involves problems of heat dissipation and of heavy weight of the brake pad.

In order to solve the problem of the heat dissipation and of the heavy weight of the brake pad, brake pads have been proposed which have backing plates of non-metal material, in particular of plastic material. Italian Patent IT1151653, for instance, proposes a brake pad for disc brakes comprising a backing plate of thermosetting plastic material and a friction lining adhesively bonded to the backing plate. The backing plate is provided with a reinforcement insert of metal, in particular of steel, which extends over the whole surface of the backing plate, which encloses the portions of the backing plate not lined with the friction material and which is surrounded on all sides by the plastic material. The backing plate has, at least on the face to which the friction lining is bonded, a continuous reticular surface profile, which is preferably grid- or honeycomb-shaped, in order to improve bonding of the friction lining to the backing plate. The use of a backing plate of plastic material allows, compared to a conventional pad with a backing plate of metal, to reduce considerably the overall weight of the brake pad, the stiffness and the mechanical strength remaining unchanged, to limit the heat transmission from the brake pad to the brake caliper and to the associated actuation system, and to avoid annoying whistles or squeals of the brake pad during braking. However, the brake pad provided with a backing plate of plastic material known from the above-mentioned Italian document does not give enough guarantees in terms of bonding of the friction lining to the backing plate, due to the shear stresses which occur during braking and tend to cause the separation of the friction lining from the backing plate. Moreover, the brake pad provided with a backing plate of plastic material known from the above-mentioned Italian document requires an adhesive layer to be applied between the backing plate and the friction lining, which results in an increase in the manufacturing time and costs.

British Patent GB1185179 discloses a brake pad for disc brakes comprising a backing plate and a friction lining, wherein the backing plate comprises in turn a frame and a grid-like surface enclosed by the frame. When the friction lining is assembled to the backing plate, the edges of the grid-like surface of the backing plate dig into the material of the friction lining, whereby a secure bonding of the friction lining to the backing plate is obtained.

It is therefore an object of the present invention to provide a brake pad, of the type comprising a backing plate of plastic material, which ensures better adhesion between the friction lining and the backing plate than the prior art.

This and other objects are fully achieved by virtue of a brake pad having the features set forth in the enclosed independent claim 1.

Advantageous embodiments of the present invention are specified in the dependent claims, the content of which is to be intended as integral and integrating part of the following description.

In short, the invention is based on the idea of providing a brake pad comprising a backing plate of plastic material and a friction lining overmoulded on the backing plate, wherein the backing plate has a plurality of through cavities which occupy an area amounting at least to 4.5% of the area of face of the friction lining opposite to the one in contact with the backing plate, and wherein the through cavities of the backing plate are filled at least partially by the material of the friction lining.

By virtue of the provision of a plurality of through cavities (which through cavities are not provided for either in the Italian Patent IT1151653 or in the British Patent GB1185179 discussed above), the friction material which is moulded on the backing plate forms a corresponding plurality of columns which help to improve bonding of the friction lining to the backing plate.

Preferably, the backing plate comprises a solid peripheral structure or frame and an inner structure, the through cavities being provided, for instance evenly distributed, in the inner structure.

Preferably, the inner structure of the backing plate projects, relative to the peripheral structure, in a direction perpendicular to the plane of the backing plate, on the side of the backing plate facing towards the friction lining, so as to offer a higher resistance to the shear stresses acting on the friction lining and tending to cause the separation thereof from the backing plate.

Preferably, the plurality of through cavities is obtained in that the inner structure of the backing plate is made as a continuous reticular structure, for instance in the shape of a grid.

Preferably, undercuts are formed in each of the through cavities of the backing plate and serve to anchor the small bridges formed by the friction material in the through cavities to the backing plate and therefore to improve bonding of the friction lining to the backing plate.

Preferably, the brake pad further comprises a metal reinforcement plate embedded in the backing plate.

Preferably, the reinforcement plate is fixed to the backing plate by means of a plurality of locking tabs which are formed by the backing plate and cover each a corresponding portion of the reinforcement plate.

Preferably, the reinforcement plate is of rectangular shape and the backing plate forms four locking tabs located at the four vertices of the reinforcement plate.

Preferably, the backing plate forms also a locking column extending in a corresponding through hole provided in the middle of the reinforcement plate, so as to provide a further anchoring point between the reinforcement plate and the backing plate.

Preferably, the reinforcement plate has additional through holes arranged in alignment with corresponding through cavities of the backing plate and having a shape identical to that of the through cavities, the friction material filling therefore not only the through cavities of the backing plate, but also the through holes of the reinforcement plate. In this connection, the through holes of the reinforcement plate are preferably of greater size than the corresponding through cavities of the backing plate, so as to form undercuts which further improve bonding of the friction lining to the backing plate.

A brake pad according to the present invention has, among others, the following advantages over the prior art discussed above:

increase in the contact surface between the backing plate and the friction material;

formation of a plurality of columns which cure during or after the moulding of the friction material, thereby permanently blocking the friction material inside the through cavities of the backing plate and forming a sort of framework for the backing plate; and obtaining of a single body formed by the backing plate and by the friction lining, whereby it becomes impossible for the friction material to separate from the backing plate due to the undercuts being formed in the through cavities of the backing plate.

Further characteristics and advantages of the present invention will result more clearly from the following detailed description, given purely by way of non-limiting example with reference to the appended drawings, in which:

FIG. 5 is a side elevation view of the brake pad of FIGS. 1 and 2, without friction lining;

FIG. 6 is a perspective view which shows on an enlarged scale an undercut portion formed inside a through cavity of the backing plate of the brake pad of FIGS. 1 and 2; and FIG. 7 is a section view which schematically shows an undercut formed between a through cavity of the backing plate and a through hole of the reinforcement plate of the brake pad of FIGS. 1 and 2.

Figure 1:
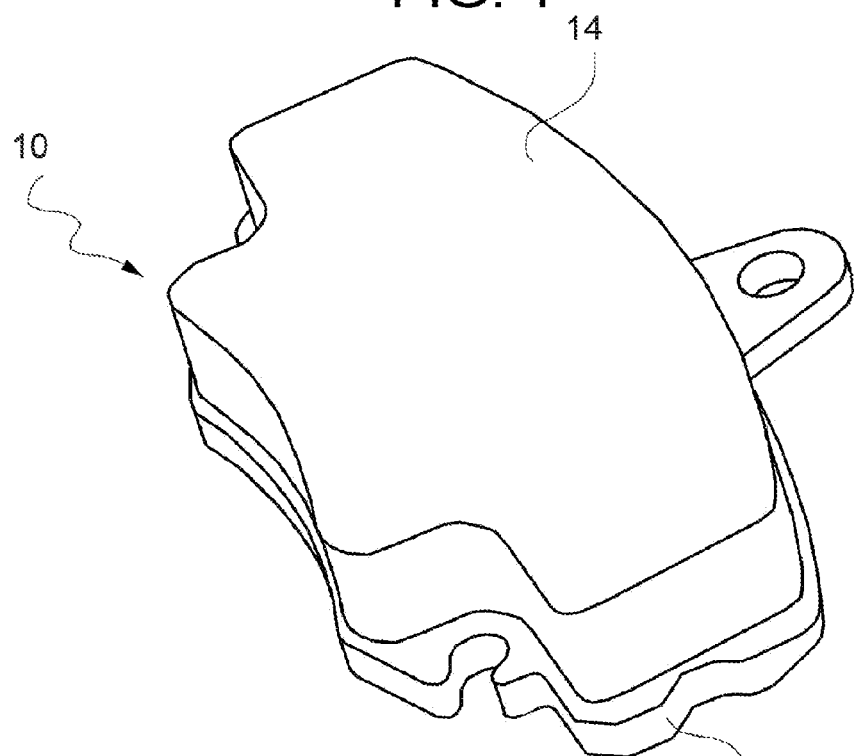
FIGS. 1 and 2 are perspective views of a brake pad for vehicle disc brakes according to a preferred embodiment of the present invention, on the side of the friction lining and on the side of the reinforcement plate, respectively.
Figure 2:
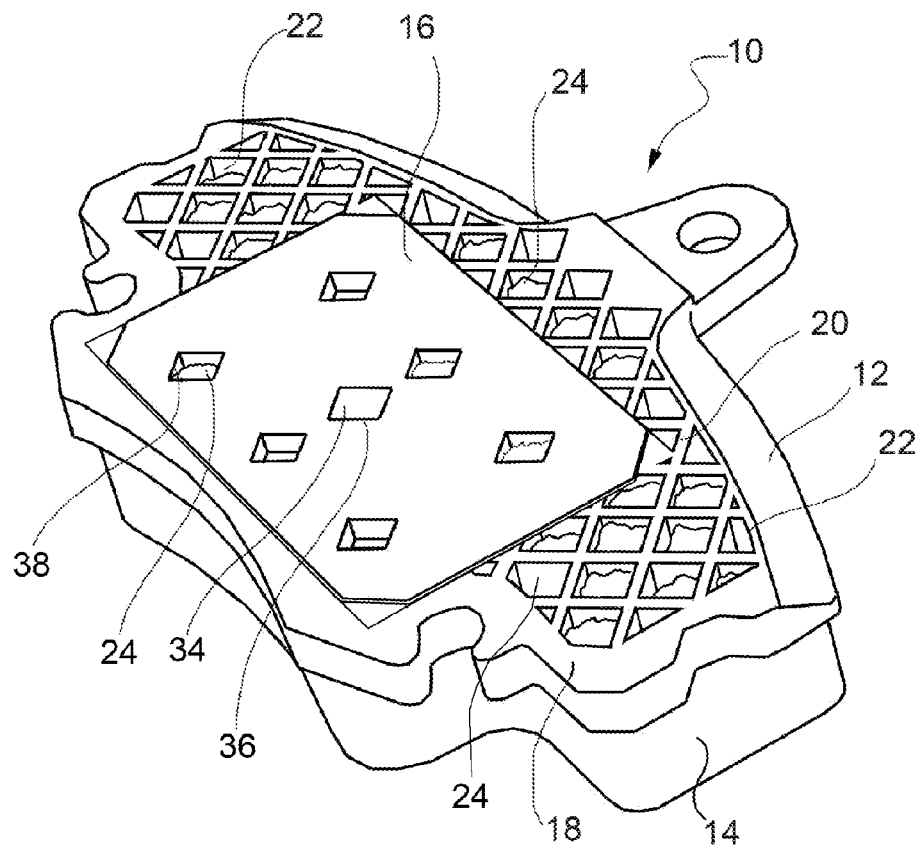

With reference to the drawings, a brake pad, particularly for vehicle disc brakes, is generally indicated 10 and comprises a backing plate 12 of plastic material and a friction lining 14 of per-se-known material which is overmoulded on the backing plate, and preferably also a reinforcement plate 16 of metal which is embedded in the backing plate 12.

The backing plate 12 is preferably made of a thermoplastic polymer, as this is a plastic material which is more suitable for moulding (for instance by means of injection moulding process) than a thermosetting polymer. An example of a thermoplastic polymer particularly suitable for use as plastic material for the backing plate 12 is the polyetherketone, since it has excellent mechanical properties even at the high temperatures reached by the brake pad in use. It is however possible to use alternatively a thermosetting polymer, such as for instance a phenol resin, to make the backing plate. More generally, any plastic material having a heat distortion temperature higher than the maximum temperature which is reached in use in the backing plate is to be regarded as suitable for being used as material for the backing plate.

The backing plate 12 integrally forms a solid peripheral structure or frame 18 and an inner structure 20 having a plurality of through cavities 22 which occupy an area amounting at least to 4.5% of the area of the face of the friction lining 14 opposite to the one in contact with the backing plate 12. The through cavities 22 are preferably evenly distributed over the surface of the inner structure 20 of the backing plate 12. The provision of the through cavities 22 in the backing plate 12 allows the friction material which is moulded on the backing plate to make the friction lining 14 to fill at least partially these cavities, thereby forming a plurality of columns 24 which help to improve the bonding of the friction lining 14 to the backing plate 12, which bonding is jeopardized by the shear stresses to which the brake pad is subject during braking and which tend to cause the separation of the friction lining 14 from the backing plate 12.

Figure 3:
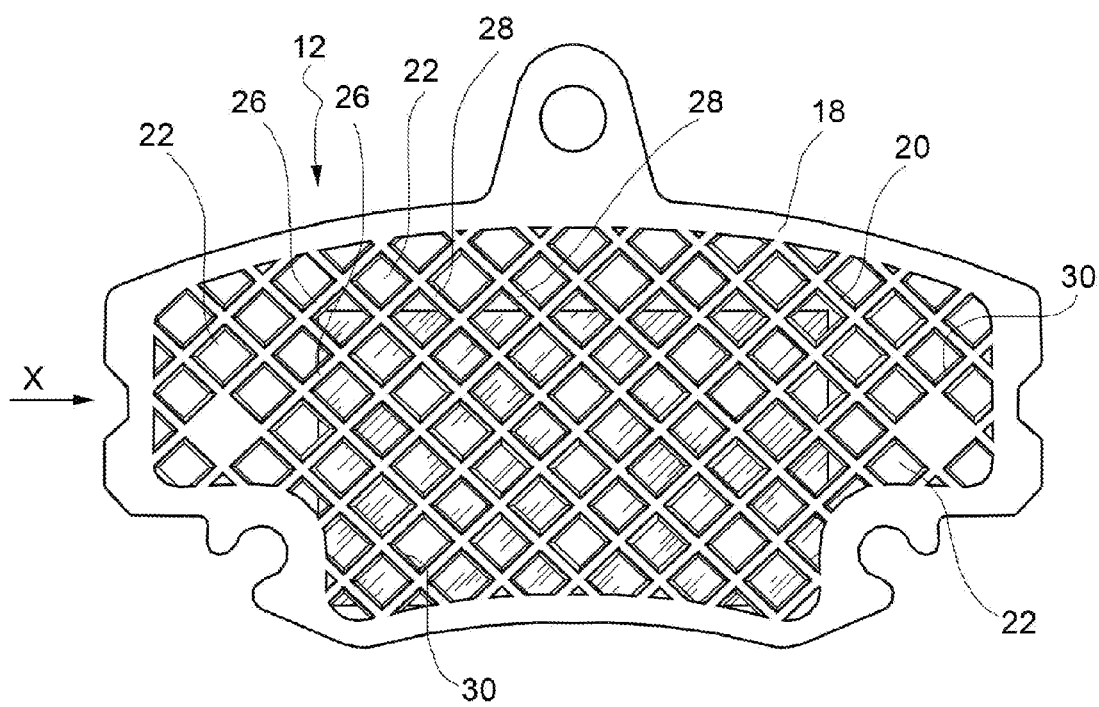
FIGS. 3 and 4 are plane views of the brake pad of FIGS. 1 and 2, without friction lining, on the side of the friction lining and on the side of the reinforcement plate, respectively.

As can be seen in the side elevation view of FIG. 5, preferably the inner structure 20 of the backing plate 12 projects outwards with respect to the face of the peripheral structure 18 facing towards the friction lining 14, in a direction perpendicular to the plane of the backing plate 12, thereby providing higher resistance to the shear stresses acting on the friction lining 14 during braking and tending to cause the friction lining 14 to slip over the backing plate 12. The portion of the inner structure 20 projecting from the face of the peripheral structure 18 facing towards the friction lining 14 is in fact wholly embedded by the material of the friction lining 14, as can be noticed in particular from the perspective view of FIG. 1. The amount of projection of the inner structure 20 of the backing plate 12 relative to the face of the peripheral structure 18 facing towards the friction lining 14 may be constant, as is the case in the embodiment illustrated in the drawings (see in particular FIG. 5), or variable, for instance linearly decreasing from the one end of the inner structure 20 to the other end with respect to the longitudinal direction of the brake pad (indicated X in FIGS. 3 and 4), so as to be maximum at an end and minimum at the opposite end, or again linearly decreasing from the opposite longitudinal ends of the inner structure 20 to the centre, so as to be maximum at the longitudinal ends and minimum in the centre.

The inner structure 20 of the backing plate 12 is preferably made as a continuous reticular structure, in particular as a grid-like reticular structure, with a first set of parallel and equally-spaced ribs 26 and a second set of parallel and equally-spaced ribs 28, which extend at an angle to the first set of ribs 26, thereby defining through cavities 22 of rhombic shape. In particular, in the illustrated embodiment the first and second sets of ribs 26 and 28 extend perpendicularly to each other, thereby defining through cavities 22 of square shape. Moreover, in the illustrated embodiment the first and second sets of ribs 26 and 28 extend at 45° to the longitudinal direction X. It is however clear that many other shapes of the reticular structure may be envisaged, insofar as they define a plurality of through cavities which occupy an area amounting at least to 4.5% of the area of the face of the friction lining 14 opposite to the one in contact with the backing plate 12. A particularly preferred value of the area of the through cavities 22 is equal to at least 40% of the area of the face of the friction lining 14 opposite to the one in contact with the backing plate 12.

In order to improve the bonding of the friction lining 14 to the backing plate 12, in each of the through cavities 22 of the backing plate there are provided undercuts 30 (FIG. 6), which are made for instance as projecting ribs which are located approximately at half the depth of the through cavities and extend along the whole inner perimeter of the through cavities. The undercuts 30 are made so as not to hinder the flow of the friction material in the through cavities 22 during the moulding of the friction lining 14 on the backing plate 12 and to anchor, once the friction lining 14 has been moulded, the columns 24 formed by the friction material in the through cavities 22, thereby opposing the separation of the friction lining 14 from the backing plate 12 in a direction perpendicular to the plane of the backing plate 12.

The reinforcement plate 16 is advantageously made of rust-proof metal and forms with the backing plate 12 a single piece which is obtained by overmoulding the plastic material of the backing plate 12 on the reinforcement plate 16 by means of injection moulding process. The reinforcement plate 16 is placed in the backing plate 12 on the opposite side to the one on which the friction lining 14 is arranged. The reinforcement plate 16 is fixed to the backing plate 12 by means of a plurality of locking tabs 32 formed by the backing plate 12, each of which covers a corresponding portion of the reinforcement plate 16. In the illustrated embodiment, the reinforcement plate 16 is of rectangular shape and the backing plate 12 forms four locking tabs 32 located at the four vertices of the reinforcement plate 16. The reinforcement plate 16 is secured to the backing plate 12 also by means of a locking column 34 formed by the backing plate 12 and extending in a corresponding through hole 36 provided in the middle of the reinforcement plate 16. Both the locking tabs 32 and the locking column 34 are obtained during the overmoulding of the backing plate 12 on the reinforcement plate 16.

Some of the through cavities 22 of the backing plate 12 are closed at an end thereof by the reinforcement plate 16 and therefore the reinforcement plate 16 is in contact not only with the backing plate, but also with the columns of friction material which fill these closed cavities. Accordingly, the pressure force applied by the brake piston onto the brake pad 10 is discharged not only onto the backing plate 14 but also, via the reinforcement plate 16, onto the columns of friction material which are in contact with the reinforcement plate 16, thereby avoiding the generation of scores or impressions on the backing plate 12 which might occur in particular at operating temperatures close to the softening temperature of the plastic material of the backing plate 12.

In addition to the central through hole 36, the reinforcement plate 16 has additional through holes 38 which are disposed in alignment with corresponding through cavities 22 of the backing plate 12 and have a shape identical to that of the through cavities 22 (a square shape in the illustrated embodiment), whereby the columns 24 formed by the friction material extend not only inside the through cavities 22 of the backing plate 12, but also inside the through holes 38 of the reinforcement plate 16. These additional through holes 38 of the reinforcement plate 16 are of greater size than the corresponding through cavities 22 of the backing plate 12, thereby forming undercuts 40 (FIG. 7) which help to anchor the friction lining 14 to the backing plate 12.

Figure 4:
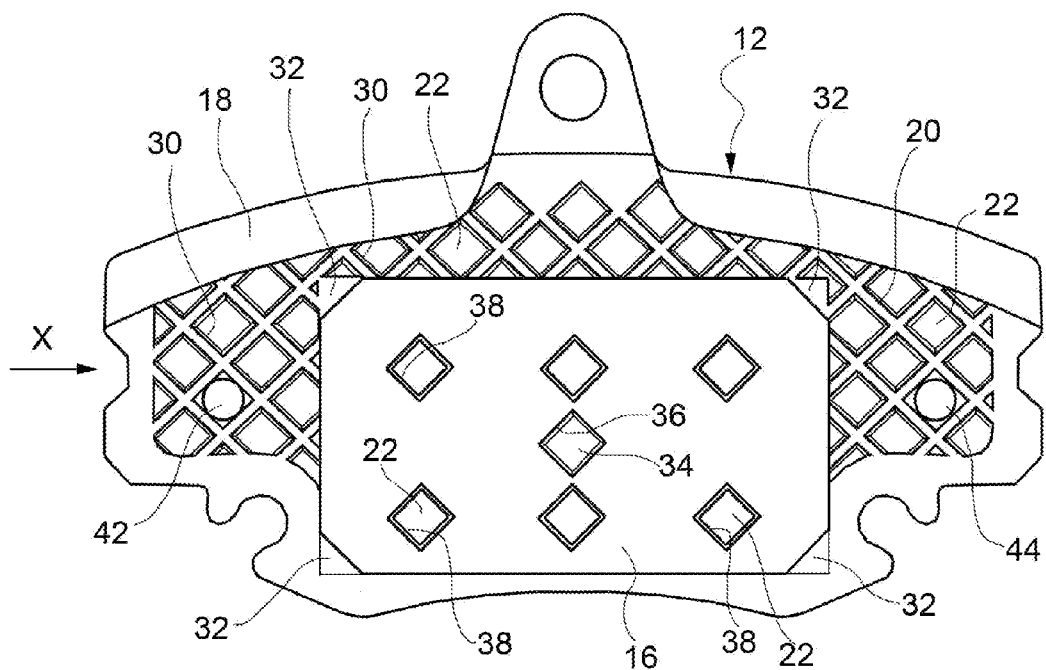

As shown in the plane view of FIG. 4, the backing plate 12 further has a first blind cavity 42, preferably of cylindrical shape, which is configured to allow a wear indicator (per-se-known and not illustrated) to be snap-fitted into it. The brake pad 10 can thus be already delivered equipped with the wear indicator, whereby the operator assigned to the mounting of the brake pad on the vehicle is simply required to connect to the wear indicator the electric wire intended to send the signal to the instrument panel of the vehicle. The backing plate 12 additionally has a second blind cavity 44, preferably of cylindrical shape as well, which is configured to allow a temperature probe (per-se-known and not illustrated) for detecting the temperature of the brake pad to be snap-fitted into it, the temperature probe being intended to be connected by means of a special wire to the instrument panel of the vehicle to warn the driver, through a warning light indicator or another warning device, of possible overheating or other undesired anomalous thermal behaviour of the brake pad which might jeopardize not only the braking efficiency, but also, if repeated over the time, the integrity of the friction lining. As an alternative to the snap-fitting, both the wear indicator and the temperature probe might be inserted into the backing plate 12 also by co-moulding.

In the light of the above description, the advantages offered by a brake pad according to the present invention are apparent.

The presence of the through cavities in the backing plate allows to ensure the necessary bonding of the friction lining to the backing plate without requiring the deposition of an adhesive layer on the face of the backing plate to which the friction lining is applied. Such an effect is further improved by virtue of the inner structure of the backing plate being made as a reticular structure which projects with respect to the peripheral structure of the backing plate on the side of the friction lining. It is however possible to apply an adhesive layer, in particular of thermosetting adhesive, on the surface of the inner structure and of the peripheral structure of the backing plate with which the material of the friction lining will be in contact, in order to further ensure the adhesion between the friction lining and the backing plate. In order to further ensure the adhesion between the friction lining and the backing plate, it is also possible for the surface of the backing plate intended to come into contact with the friction material to undergo a corona treatment or a flaming process.

The use of a plastic material as the material of the backing plate, instead of a metal (such as steel, in particular), allows a significant reduction in the overall weight of the brake pad, which results in advantages both in terms of costs for handling, assembling and finally delivering the brake pad, and in terms of improvement in the response speed of the braking system as a result of the smaller inertia. Moreover, the use of a plastic material as the material of the backing plate makes it possible to avoid direct corrosion of the brake pad and corrosion induced to/by other parts of the braking system. The use of a plastic material as the material of the backing plate also allows to avoid the costs for the final painting of the backing plate. The use of a plastic material having a low linear expansion coefficient and a low heat transfer coefficient as the material of the backing plate allows to ensure optimal operation of the brake pad even at a temperature close to the maximum operating temperature and to reduce significantly the transmission to the piston, and hence to the liquid contained in the hydraulic circuit of the braking system, of the heat generated during braking, thereby greatly limiting the risk that "vapour lock" phenomena occur in case of intense use of the braking system.

Furthermore, the brake pad according to the invention is not prone to whistles or squeals. In fact, the plastic material of the backing plate on the one hand stops the sound waves generated by the assembly of the braking system and of the wheel suspension system (brake caliper, brake disc, suspension links and shock-absorber) and on the other hand fully dampens the vibrations generated by the metal reinforcement plate embedded in the backing plate.

In addition, the use of a backing plate of plastic material having the above-described characteristics offers to the brake pad manufacturers significant economic advantages which are due both to the lack of some of the operations currently provided for in the manufacturing cycle of the brake pads having metal backing plates, in particular the operations of sandblasting or the like, of application of an adhesive layer, of final protective painting, of application of a sound-proof layer, of mounting of a wear indicator (if any), with resulting cutting of the times and costs linked to these operations, and to the minor impact due to the disposal of waste chemical products, such as sand, adhesives and paints. The remaining operations of moulding, ageing or stabilization, scorching, grinding and fitting of accessories, as well as the associated equipments, do not require any modifications. The end product obtained is functionally and aesthetically identical to the one currently used which has a backing plate of metal and is therefore fully interchangeable with this latter.

A further advantage is that the whole brake pad can be manufactured in the same moulding unit, using for instance a multi-station rotating-table press (or an equivalent moulding apparatus) arranged to carry out in sequence the moulding of the backing plate with an embedded reinforcement plate and the moulding of the friction lining on the backing plate.

Naturally, the principle of the invention remaining unchanged, the embodiments and manufacturing details may be widely varied with respect to those described and illustrated purely by way of non-limiting example.

The invention claimed is:

1. Brake pad comprising a backing plate of plastic material, a friction lining overmoulded on the backing plate, and a metal reinforcement plate embedded in the backing plate; the backing plate comprising a solid peripheral structure and an inner structure having a plurality of cavities filled at least partially by material of the friction lining; wherein at least part of the cavities are made as orifices extending through the inner structure of the backing plate; wherein undercuts are formed by the plastic material in the orifices of the backing plate; and wherein the orifices occupy an area amounting at least to 4.5% of the area of a face of the friction lining opposite to a face in contact with the backing plate.

2. Brake pad according to claim 1, wherein the inner structure of the backing plate projects with respect to the peripheral structure, in a direction perpendicular to a plane of the backing plate, on a side of the backing plate facing towards the friction lining.

3. Brake pad according to claim 1, wherein the cavities are evenly distributed on a surface of the inner structure of the backing plate.

4. Brake pad according to claim 3, wherein the inner structure of the backing plate is made as a grid-like reticular structure comprising a first set of parallel and equally-spaced ribs and a second set of parallel and equally-spaced ribs, which extend at an angle to the first set of ribs, defining the cavities as having a rhombic shape.

5. Brake pad according to claim 1, wherein the cavities occupy an area amounting to at least 40% of the area of a face of the friction lining opposite to a face in contact with the backing plate.

6. Brake pad according to claim 1, wherein the backing plate is made of thermoplastic polyetherketone.

7. Brake pad according to claim 1, wherein the reinforcement plate has through holes aligned with corresponding ones of the cavities of the backing plate and having an identical shape to a shape of said cavities, the material of the friction lining filling at least partially said through holes.

8. Brake pad according to claim 1, further comprising a wear indicator or a temperature probe incorporated in the backing plate.

9. Brake pad according to claim 8, wherein the backing plate further has a first blind cavity in which the wear indicator is accommodated or a second blind cavity in which the temperature probe is accommodated.

* * * * *